United States Patent
Sarmento et al.

(10) Patent No.: US 9,727,906 B1
(45) Date of Patent: Aug. 8, 2017

(54) GENERATING ITEM CLUSTERS BASED ON AGGREGATED SEARCH HISTORY DATA

(71) Applicant: Amazon Technologies, Inc., Seattle, WA (US)

(72) Inventors: Luis Antonio Diniz Fernandes de Morais Sarmento, Seattle, WA (US); Tao Yu, Cambridge, MA (US); Alexander Michael Spinelli, Seattle, WA (US); Lisa Jane Hinegardner, Issaquah, WA (US); Haris Husain, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 449 days.

(21) Appl. No.: 14/570,406

(22) Filed: Dec. 15, 2014

(51) Int. Cl.
*G06Q 30/06* (2012.01)
*G06Q 30/02* (2012.01)
*G06F 17/30* (2006.01)

(52) U.S. Cl.
CPC ..... *G06Q 30/0631* (2013.01); *G06F 17/3071* (2013.01); *G06F 17/30864* (2013.01); *G06Q 30/0255* (2013.01); *G06Q 30/0256* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 7,194,454 B2 * | 3/2007 | Hansen | G06F 17/30864 |
| 7,321,892 B2 | 1/2008 | Vadon et al. | |
| 7,536,384 B2 * | 5/2009 | Venkataraman | G06F 17/30713 |
| 7,552,112 B2 * | 6/2009 | Jhala | G06F 17/3064 |
| 8,117,085 B1 | 2/2012 | Smith | |
| 8,145,623 B1 | 3/2012 | Mehta et al. | |

(Continued)

OTHER PUBLICATIONS

Choeh, J.Y. et al., "Mobile Push Personalization and User Experience," Al Communications, 21 (2008) pp. 185-193.*

(Continued)

*Primary Examiner* — Nicholas D Rosen
(74) *Attorney, Agent, or Firm* — Knobbe, Martens Olson & Bear, LLP

(57) ABSTRACT

The present disclosure provides computer-implemented systems and processes for clustering items and improving the utility of item recommendations. One process involves applying a clustering algorithm to users' search session queries over periods of time to generate query clusters comprising correlated query terms. Correlations may be based on, among other things, the frequency of which query term pairs appear together in a single search session. The generated query clusters may be used to generate item descriptor clusters indicative of items and/or types of items that may be complementary. Other criteria may be applied to the query and item clusters to generate variant clusters. For example, information such as related brands, market segments, and other data may be applied to item descriptor clusters to generate item clusters that include complementary items associated with or targeted for particular demographics. Item descriptor clusters and item clusters can be used to improve the item recommendations.

21 Claims, 9 Drawing Sheets

(56) References Cited

U.S. PATENT DOCUMENTS

| | | | |
|---|---|---|---|
| 8,229,957 B2* | 7/2012 | Gehrking | G06F 17/30707 707/737 |
| 8,271,357 B2* | 9/2012 | Mohan | G06Q 30/02 705/14.49 |
| 8,285,602 B1 | 10/2012 | Yi et al. | |
| 8,438,052 B1 | 5/2013 | Chanda et al. | |
| 9,037,589 B2* | 5/2015 | Anderson | G06F 17/30286 707/737 |
| 9,286,391 B1* | 3/2016 | Dykstra | G06F 17/30864 |
| 9,361,640 B1* | 6/2016 | Donsbach | G06Q 30/0625 |
| 9,483,559 B2* | 11/2016 | Gollapudi | G06F 17/30864 |
| 2003/0014399 A1* | 1/2003 | Hansen | G06F 17/30864 |
| 2005/0222987 A1* | 10/2005 | Vadon | G06F 17/30997 |
| 2006/0242147 A1* | 10/2006 | Gehrking | G06F 17/30707 |
| 2007/0038615 A1* | 2/2007 | Vadon | G06F 17/273 |
| 2008/0071740 A1* | 3/2008 | Jhala | G06F 17/3064 |
| 2008/0071771 A1* | 3/2008 | Venkataraman | G06F 17/30713 |
| 2009/0106108 A1* | 4/2009 | Ku | G06Q 30/0256 705/14.54 |
| 2009/0150214 A1* | 6/2009 | Mohan | G06Q 30/02 705/14.52 |
| 2009/0313228 A1* | 12/2009 | Grandhi | G06F 17/3071 |
| 2013/0124524 A1* | 5/2013 | Anderson | G06F 17/30286 707/737 |
| 2014/0025532 A1* | 1/2014 | Huang | G06Q 30/0631 705/26.7 |
| 2014/0108206 A1* | 4/2014 | Chechuy | G06Q 30/0603 705/27.1 |
| 2014/0258303 A1* | 9/2014 | Gollapudi | G06F 17/30864 707/740 |
| 2015/0081477 A1* | 3/2015 | Shime | G06F 17/30867 705/26.63 |
| 2015/0348160 A1* | 12/2015 | Ravikant | G06Q 30/0627 705/26.63 |

OTHER PUBLICATIONS

Indratmo, "Supporting Exploratory Browsing with Visualization of Social Interaction History," Dissertation, University of Saskatchewan, Saskatoon, Saskatchewan, Canada, 2010.*

Long, A.W., et al., "Frequent Pattern Using Multiple Attribute Value for Itemset Generation," 2011 3rd Conference on Data Mining and Optimization (DMO): pp. 44-50, IEEE (2011).*

* cited by examiner

| Home Entertainment | |
|---|---|
| sound bar | tv stand |
| xbox one | tv wall mount |
| home theater system | blu ray player |
| blue ray player | dvd player |
| projector | hdmi cable |
| surround sound system | |

| Casual | |
|---|---|
| ray ban | g shock |
| watch | sunglasses |
| shoes | watches |
| polo | rayban |
| levis | |

| Audio | |
|---|---|
| earbuds | microphone |
| beats by dre | ear buds |
| headset | earphones |
| earphone | speakers |
| bluetooth headset | |
| bluetooth speakers | |
| gaming headset | |

| Bedding | |
|---|---|
| quilt | bedding |
| pillows | blanket |
| sheets | pillowcase |
| duvet cover | comforter |
| bed sheets | |

| Home Theater | |
|---|---|
| sound bar | projector |
| surround sound | subwoofer |
| home theater system | receiver |
| bluetooth speakers | speakers |
| soundbar | surround sound system |

| Beach | |
|---|---|
| swimsuits | board shorts |
| swim trunks | bikini |
| swim shorts | swimwear |
| tankini | rash guard |
| swimsuit | bathing suits |

| Furniture | | | | | |
|---|---|---|---|---|---|
| shelves | bookshelves | tv stand | storage | wardrobe | dresser | closet | organizer |
| desk | side table | coffee table | armoire | end table | bookcase | storage cabinet |
| shoe rack | bookshelf | nightstand | floor lamp | bedside table | cabinet | closet organizer |

GENERATING ITEM CLUSTERS BASED ON AGGREGATED SEARCH HISTORY DATA

BACKGROUND

Network sites and other types of interactive electronic catalog systems commonly include recommendation systems for providing recommendations of items (e.g., goods and/or services) available from the network site. The recommendations are typically generated based on monitored user activities or behaviors, such as item purchases, item viewing events, item rentals, and/or other types of item selection actions. In some systems, the recommendations are additionally or alternatively based on users' explicit ratings of items. Some systems generate recommendations of bundles of two or more items, such as items that tend to be purchased in combination. Existing processes for generating such bundle recommendations, however, often fail to adequately identify and consider the contexts in which users tend to acquire combinations of items.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 9 is a pictorial diagram depicting several example item descriptor clusters, as generated according to one embodiment of an electronic catalog system, such as the electronic catalog system of FIG. 2.

DETAILED DESCRIPTION

Overview

Figure 1:
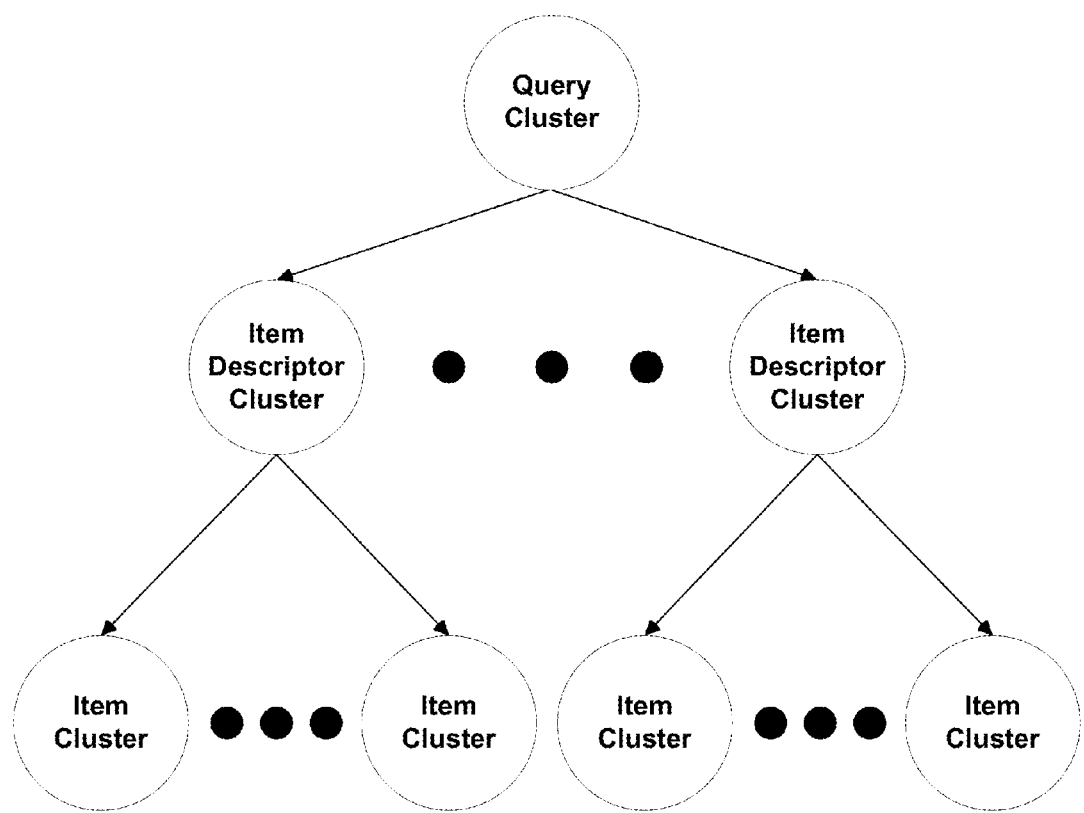
FIG. 1 illustrates the relationship between query clusters, item descriptor clusters, and item clusters, according to one embodiment.

Several different computer-implemented processes will now be described for using search session analysis and query clustering to improve the utility of item bundle recommendations provided to users. These processes may be embodied individually or in any combination in a multi-user computer system ("system") that includes or uses a query cluster generator and/or an item cluster generator to generate item descriptor clusters and/or item clusters that may be used for recommendations. A recommendation engine capable of selecting items to recommend to a user based on a set of source items, such as generated item clusters, may also be used.

For purposes of illustration, the processes are described primarily in the context of a system that recommends catalog items to users of an electronic catalog. As will be apparent, however, the disclosed processes can also be used to recommend other types of items, such as but not limited to network sites, news articles, blogs, travel destinations, service providers, other users, and events. In addition, the disclosed processes need not be implemented as part of, or in conjunction with, a network site.

The present disclosure describes embodiments of systems and methods for streamlining and improving the user experience of browsing and shopping (or otherwise acquiring) for items available from network-based retailers and marketplaces, such as items available for purchase from an electronic catalog. Users of an electronic catalog may spend a considerable amount of time searching for items before ultimately making a selection and a purchase. A user will often conduct multiple searches for one or related items during a particular browsing session, whether or not the user ultimately makes a decision to purchase. In some instances users may feel overwhelmed by the ever-growing number of items available in an electronic catalog, especially in product markets that are crowded with many different brands, producers, and the like offering items with a wide array of options and prices.

One process described herein involves applying a clustering algorithm to users' search session queries over periods of time to generate query clusters including correlated query terms (including single word query terms as well as multiple word or combination query search phrases). Correlations may be based on, among other things, a co-occurrence analysis and/or the frequency with which particular query term pairs appear together in a single search session. The generated query clusters may be used to generate corresponding item descriptor clusters including item descriptors, item labels, and/or other item attributes that are generally descriptive of items and/or types of items that are likely complementary and/or likely to be searched for in combination. Item descriptor cluster generation criteria may be applied to the query and item descriptor clusters to generate variant clusters and/or bundles. For example, information such as related brands, market segments, and other data may be applied to item descriptor clusters to generate variations of the item descriptor clusters that include item descriptors, item labels, and/or other item attributes that are generally descriptive of complementary items associated with, or targeted for, particular demographics, lifestyles, or contexts.

An item descriptor cluster can be used to generate one or more associated item clusters including one or more specific items in an electronic catalog that match the item descriptor criteria for the item descriptor cluster. An item cluster may, but need not, include all items in an electronic catalog that match the item descriptor criteria for the associated item descriptor cluster. Specific items in an item cluster may not match all item descriptor criteria for the associated item descriptor cluster. Item descriptor clusters and item clusters can be used to improve the recommendations and/or item suggestions generated by a recommendation engine. For example, an item descriptor cluster can be used to execute a search query to generate an item cluster that includes one or more specific items in an electronic catalog matching or correlating to the item descriptor criteria, and provide item recommendations or item suggestions including the one or more specific items.

The systems and methods described herein can provide many benefits. For example, users may be less likely to miss certain items that are identified and presented automatically via the item descriptor clusters and item clusters. Related to this, users may have to spend less effort searching for items on a per-item basis. For example, suppose a user is preparing for an upcoming ski trip and wishes to purchase a pair of ski goggles, a snow jacket, and ski pants, among other things. When the user accesses the electronic catalog and submits a first search (say, for ski goggles), the electronic catalog system may access or generate related query or item descriptor clusters for "skiing" or "snow," and present the user not only with search results for "ski goggles" but also related item recommendations for snow jackets, ski pants, ski masks, warm base layer clothing, and other items that the user may or may not have been contemplating, but may find of interest.

In addition, the electronic catalog may further refine or improve the process by applying an additional layer to the query and/or item descriptor clusters. For example, related brand information may be accessed and applied to the "skiing" or "snow" item descriptor cluster for the user to generate variant item descriptor clusters that may be of more interest to the user. The related brand information may be identified or suggested from the user's search (for example, the user may search for ski goggles made by a particular brand or producer), or the related brand information may be suggested from some other data available to the electronic catalog system. For example, the user's past purchase history may indicate a certain brand preference, which can in turn be used to identify related brands of possible interest. The related brand information may then be used to refine the item recommendations for the user to reflect items in an item cluster that are made or offered by the brand or related brands of possible interest to the user. Although for ease of illustration one additional layer for "related brands" is described here, it is possible to apply as many layers as desired to generate variant item descriptor clusters at any level of granularity desired. For example, layers specifying particular colors or any other descriptive attribute of the items in the item descriptor clusters may be applied.

One advantage provided by the clustering techniques described herein is that the resulting query clusters and item descriptor clusters may be stable and persist over time, regardless of whether individual items remain available in the electronic catalog. In general, the item descriptor clusters described herein may be generated to include search terms or items of a particular type (for example, "ski goggles" or "ski mask"). As items of that particular type are added to or removed from the electronic catalog, they may or may not be included in item clusters associated with item descriptor clusters or in search results obtained from executing related query clusters.

One particular advantage of the stability and persistence feature of the query clusters and item descriptor clusters is that it enables search history data that has been captured, gathered, or collected over long periods of time (for example, the last five or ten years) to be accessed and used to generate these clusters. The potentially enormous volume of data available to generate these clusters can contribute to high degree of accuracy, productiveness, and other statistically significant factors that support a conclusion that the generated query clusters and item descriptor clusters are extremely accurate with very low margins of statistical error. Item clusters generated from these query clusters and item descriptor clusters can thus similarly enjoy the benefit of being highly accurate, even though some items in those item clusters may be relatively new products without much associated search history of their own.

Another advantage of the stability and persistence feature of the query clusters and item descriptor clusters is that they may continue to be re-used over time as new items are introduced or added to the catalog and other items are discontinued, making such query clusters and item descriptor clusters powerful tools to provide meaningful contextual item recommendations no matter what items may be available in the catalog at any given time.

Embodiments of the disclosure will now be described with reference to the accompanying figures. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

For purposes of this disclosure, certain aspects, advantages, and novel features of various embodiments are described herein. It is to be understood that not necessarily all such advantages may be achieved in accordance with any particular embodiment. Thus, for example, those skilled in the art will recognize that one embodiment may be carried out in a manner that achieves one advantage or group of advantages as taught herein without necessarily achieving other advantages as may be taught or suggested herein.

Example Clustering

FIG. 1 illustrates the relationship between query clusters, item descriptor clusters, and item clusters As described herein, the query cluster may include a cluster or grouping of related query terms. The query cluster may be generated, for example, by analyzing user search session logs and queries to identify one or more pairs of query terms (and/or query phrases including multiple query terms, in some embodiments) that tend to have a high co-occurrence of being searched together in a single search session. The query pairs may be analyzed and grouped together such that query terms in the query cluster are generally indicative of types of items that tend to be likely to go well together and/or searched for together. For example, users searching for "beach towel" might also search for "swimsuit," "sunscreen," "beach umbrella," and other beach-related items. Thus a query cluster may be generated to include these and other related query terms.

As illustrated, a query cluster may be associated with, and/or used to generate, one or more item descriptor clusters. Each item descriptor cluster may include item descriptors, item labels, and/or other item attributes that are generally descriptive of items and/or types of items that are likely complementary or likely to be searched for in combination. Each item descriptor cluster may be generated based at least in part on a set or subset of query terms associated with the query cluster. For example, suppose the query cluster includes ten related queries or query terms. Then one item descriptor cluster may be generated based on all ten of the query terms in the query cluster, another item descriptor cluster may be generated based on five of the query terms in the query cluster, yet another item descriptor cluster may be generated using a different five of the query terms, and so on in any possible combination or sampling of the one to N queries or query terms in the query cluster.

Additionally, variations on item descriptor clusters may be generated by joining or combining item descriptor clusters with additional item cluster generation criteria. For example, information regarding sets of related brands, market segments, or other attributes may be applied to an item descriptor cluster to generate variant item descriptor clusters for particular related brands, market segments, and other criteria. Thus, for example, a first item descriptor cluster for beach-related items may be used to generate a second item descriptor cluster that includes descriptors for beach-related items produced or associated with one set of related brands (e.g., premium, designer, or luxury brands), and to generate a third item descriptor cluster that includes descriptors for beach-related items produced or associated with another set of related brands (e.g., mass-market or "every day" brands).

As FIG. 1 further illustrates, each item descriptor cluster may be associated with, and/or used to generate, one or more item clusters. Each item cluster may include one or more specific items (e.g., items available in an electronic catalog) that match criteria associated with the item descriptor cluster. Item clusters may be used to generate and provide item recommendations or suggestions, for example, in response to user search requests or item viewing events. Continuing the example above, one item cluster may include specific beach-related items (e.g., specific sunglasses, beach towels, swimsuits, etc.) that are produced by various related premium brands, while another item cluster may include specific beach-related items that are produced by various every day brands. In one embodiment, item recommendations or suggestions may be provided based on one item cluster, which may be selected or determined based on criteria or other information such as a user's past purchase history, to determine which item cluster may be of most interest to the user. In another embodiment, item recommendations or suggestions may be provided based on multiple item clusters that the user may be able to select for further browsing.

Example System

Figure 2:
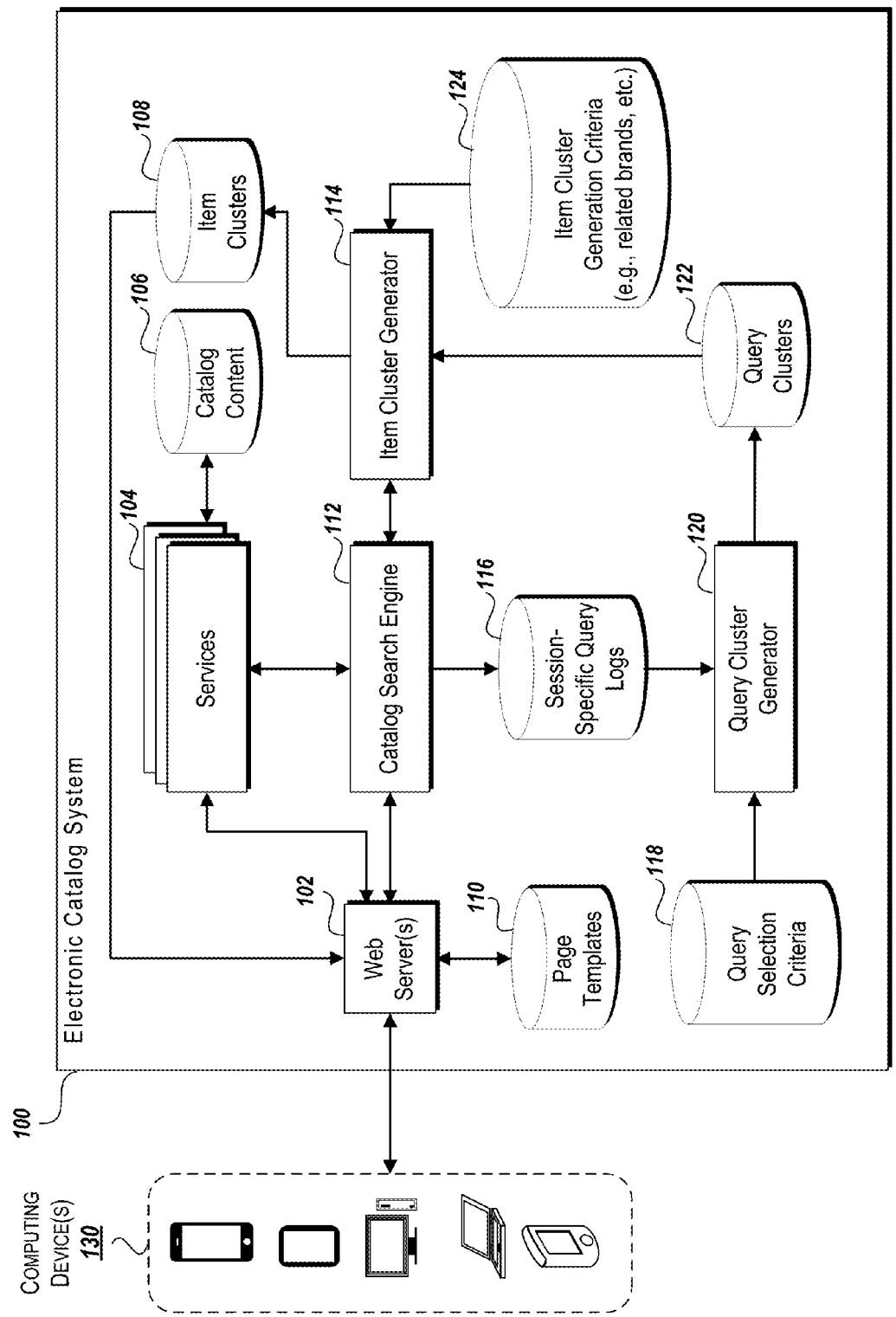
FIG. 2 schematically illustrates an embodiment of an electronic catalog system that implements search query clustering and item clustering processes, which may be used to, among other things, provide item recommendations to users.

FIG. 2 schematically illustrates an embodiment of an electronic catalog system that implements search query clustering and item clustering processes, which may be used to, among other things, provide item recommendations to users. The electronic catalog system may be implemented as a computerized system that includes multiple programmed computing devices (e.g., network server machines, application servers, storage servers, load balancers, etc.) that communicate over one or more networks. The electronic catalog system 100 may host a network site that provides functionality for users to browse an electronic catalog of items that are available for purchase. The items represented in the catalog may include, for example, physical products, music or video downloads, electronic book downloads, software applications, magazine subscriptions, mobile service plans, and other types of items that can be purchased.

Although described in the context of a network site, the inventive features described herein can also be implemented in other types of interactive systems, including interactive television systems. Further, although described in the context of products that are available for purchase, the disclosed features are also applicable to other types of items, including services, news articles, blogs, network sites, and television shows.

The network server 102, which may include any number of physical servers, may dynamically generate network pages in response to requests from the user computing devices 130 (e.g., personal computers, laptops, portable computing devices, mobile phones, electronic book readers, wearable computing devices, PDAs, tablets, etc.). The network pages can be generated using a repository of network page templates 110, using data retrieved from a set of services 104. The types of services 104 can vary widely, and may include, for example, a catalog service that returns catalog data for particular items, a search service that processes search queries submitted by users, a recommendation service that generates and returns personalized item recommendations for users, a tag service that allows users to tag items, and a transaction processing services that processes purchases and/or other types of transactions.

The electronic catalog system 100 may also include a repository of catalog content 106. The catalog content may include, for example, product images, product descriptions, user ratings and reviews of particular products, price and availability data, seller data, etc. The item information in this repository may be viewable by end users through a browsable electronic catalog in which each item may be described in association with a corresponding network page, which can be referred to as an item detail page. Each item detail page may include, for example, an item image and description, customer ratings, customer and professional reviews, sales rank data, lists of related items, and/or other types of supplemental data that may assist consumers in making informed purchase decisions. Users of the system may, in some embodiments, locate specific item detail pages within the electronic catalog by executing search queries, navigating a browse tree, and/or using various other navigation techniques. An item detail page may be associated with one or more uniform resource identifiers ("URIs") that may be interpreted by a browser or other program operating on a computing device in order to present the item details, request the page information from a server or other system, or the like. A catalog search engine 112 enables users to search the catalog by submitting free-form search strings.

As shown in FIG. 2, the electronic catalog system 100 may also include a repository of session specific query logs 116 including data describing search queries that users have submitted to the electronic catalog system 100 during one or more browsing sessions over a period of time. The volume of session specific query logs may grow to be very large as potentially millions of users access the electronic catalog system 100 daily, with each user potentially submitting several search queries to the electronic catalog system 100 during any given visit or session. These search queries may be stored and gathered by the electronic catalog system 100 over time. In one example embodiment, the number of search queries for a particular period of time spanning six days may total nearly 500 million records, with at least 33 million sessions including more than one search query.

The electronic catalog system 100 may also include a query cluster generator 120 configured to perform the query clustering processes described herein, including, for example, the process 400 described with reference to FIG. 5. Query cluster generator 120 may also perform processes related to accessing and analyzing session-specific query logs to identify or determine session segments and query term pairs, as further described herein. A repository of query selection criteria 118 may also be provided, which, for example, may store rules, term blacklists and whitelists, exclusions, and other filter criteria that may be applied to queries being analyzed by the query cluster generator 120. Generated query clusters may be stored and accessed from a repository of query clusters 122.

The electronic catalog system 100 also includes an item cluster generator 114 that may be configured to perform the item clustering processes described herein, including, for example, the process 600 described with reference to FIG. 6. A repository of item cluster generation criteria 124 may also be provided, which, for example, may store item attributes, brand information, consumer or market segment and/or other data that may be applied to item descriptor clusters generated based on the query clusters. Generated item descriptor clusters may be stored and accessed from a repository of item clusters 108. Item clusters associated with item descriptor clusters may also be generated, stored, and accessed from the repository of item clusters 108.

As used herein, the term "item," in addition to having its ordinary meaning, is used interchangeably to refer to an item itself (e.g., a particular product, application, or the like) and to its description or representation in a computer system, such as an electronic catalog system. As will be apparent from the context in which it is used, the term is also sometimes used herein to refer only to the item itself or only to its representation in the computer system.

Example User Interfaces

Figure 3:
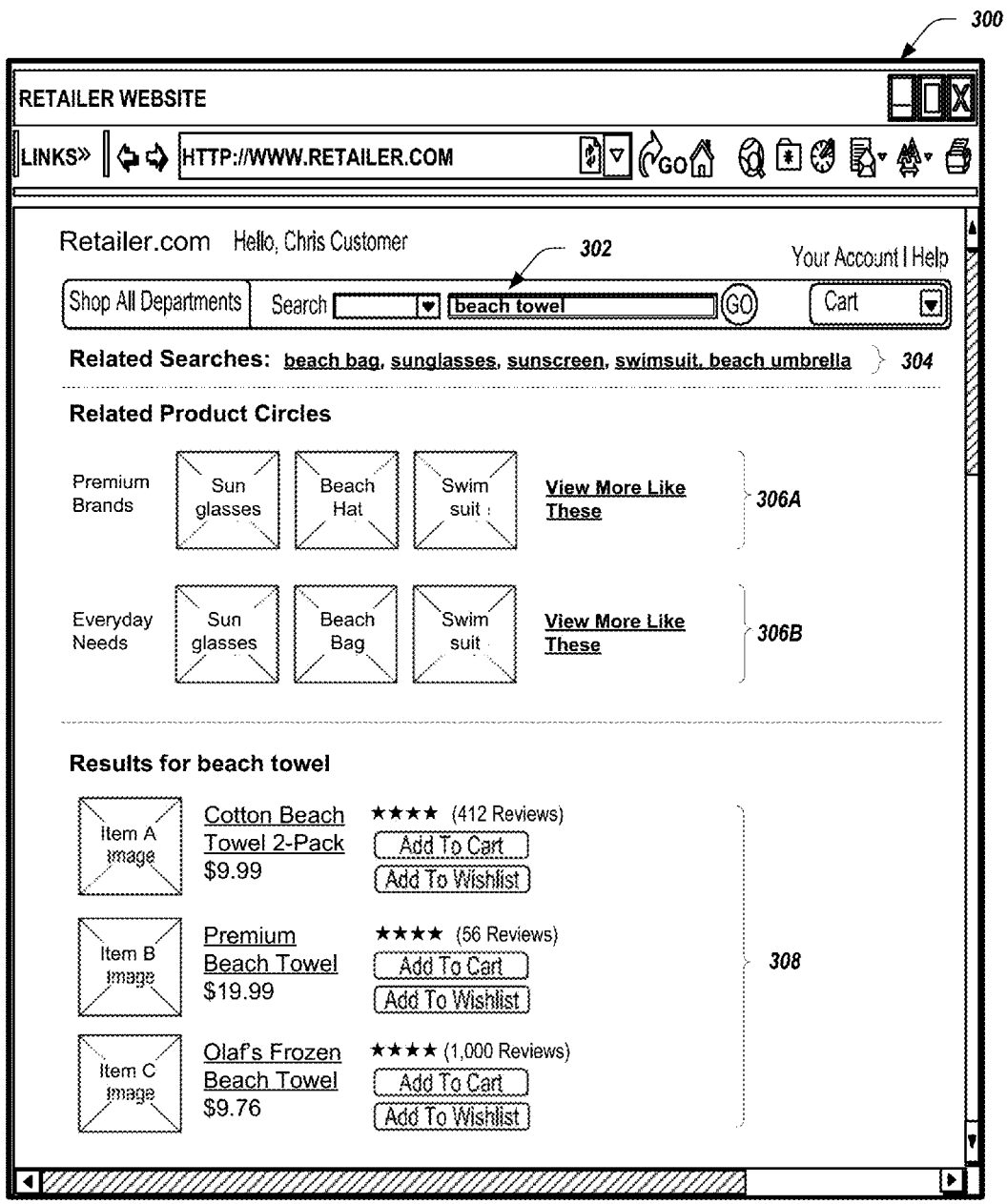
FIG. 3 is a pictorial diagram of an example user interface that illustrates a catalog search results page including various related item cluster recommendations, involving an electronic catalog system, such as the electronic catalog system of FIG. 2.

FIGS. 2 and 3 illustrate sample user interfaces that may be generated by or used with the electronic catalog system 100. In various embodiments, each of the user interfaces shown in FIGS. 2 and 3 may be presented as a network page, as a mobile application display, as a stand-alone application display, as an email message, as a text message (for example, a short message service (SMS) or a multimedia messaging service (MMS) message) or by other communication means. In other embodiments, analogous interfaces may be presented using audio or other forms of communication. In an embodiment, the interfaces shown in FIGS. 2 and 3 are configured to be interactive and respond to various user interactions. Such user interactions may include clicks with a mouse, typing with a keyboard, touches and/or gestures on a touch screen, voice commands, and/or the like.

The example user interfaces 200 and 300 are presented as they may appear, for example, in a browser as network pages. The network pages may be generated by the network server 106 (FIG. 2) using a repository of page templates 110. For purposes of illustration in FIGS. 2 and 3, the fictitious name "Retailer.com" is used in the user interface 200 and user interface 300 to refer to the electronic catalog system 100. In addition, the fictitious name Chris Customer is used to refer to a particular user/customer of the electronic catalog system 100.

FIG. 3 illustrates an example user interface 300 that presents a search results page including one or more items matching a search query along with additional recommendations for items related to the search criteria, involving an electronic catalog system, such as the electronic catalog system 100 of FIG. 2. As illustrated at page feature 302, Chris Customer has submitted a search for "beach towel" and is being presented with the search results page that includes information and matches for "beach towel." At page feature 308 the user is presented with a list of search results matching the "beach towel" query. Item recommendations may also be displayed along with the search results. For example, the Related Searches display element 304 may be presented and may include one more additional search terms that may be related to beach towel. In one embodiment, the additional search terms presented at Related Searches page feature 304 may be generated or accessed from a query or item descriptor cluster with which the "beach towel" search term is associated. For example, "beach towel" may be associated with a "beach" item descriptor cluster, which the electronic catalog system can access to identify and extract the additional search terms, such as "swimsuits" and "sunscreen."

As illustrated in FIG. 3, one or more Related Product Circles (which may be one example of item clusters generated based on the item descriptor clusters discussed herein) may be presented along with the search results page. For example, a "Premium Brands" product circle is shown at page feature 306A, and an "Everyday Brands" product circle is shown at page feature 306B. Each of these product circle display elements may present one or more items identified by the electronic catalog system as being in the same item cluster as the item being searched for. For example, the Premium Brands product circle includes a sunglasses item, a beach hat item, and a swimsuit item, while the Everyday Brands product circle includes a sunglasses item (which may be different than the Premium Brands sunglasses item), a beach bag item, and a swimsuit item (which may be different than the Premium Brands swimsuit item). In the embodiment shown in FIG. 3, each product circle is also presented with an optional description providing an indication to the user what kinds of items may be in the related product circle, as well as an optional link to view additional items similar to the items displayed, which may redirect the user to another user interface presenting additional items for the selected product circle.

Other variations on the user interface 200 may also be possible. For example, the related product circles may be displayed below the search results, or on one side of the page. More or fewer items may be displayed within each related product circle, and more or fewer product circles may be displayed.

Figure 4:
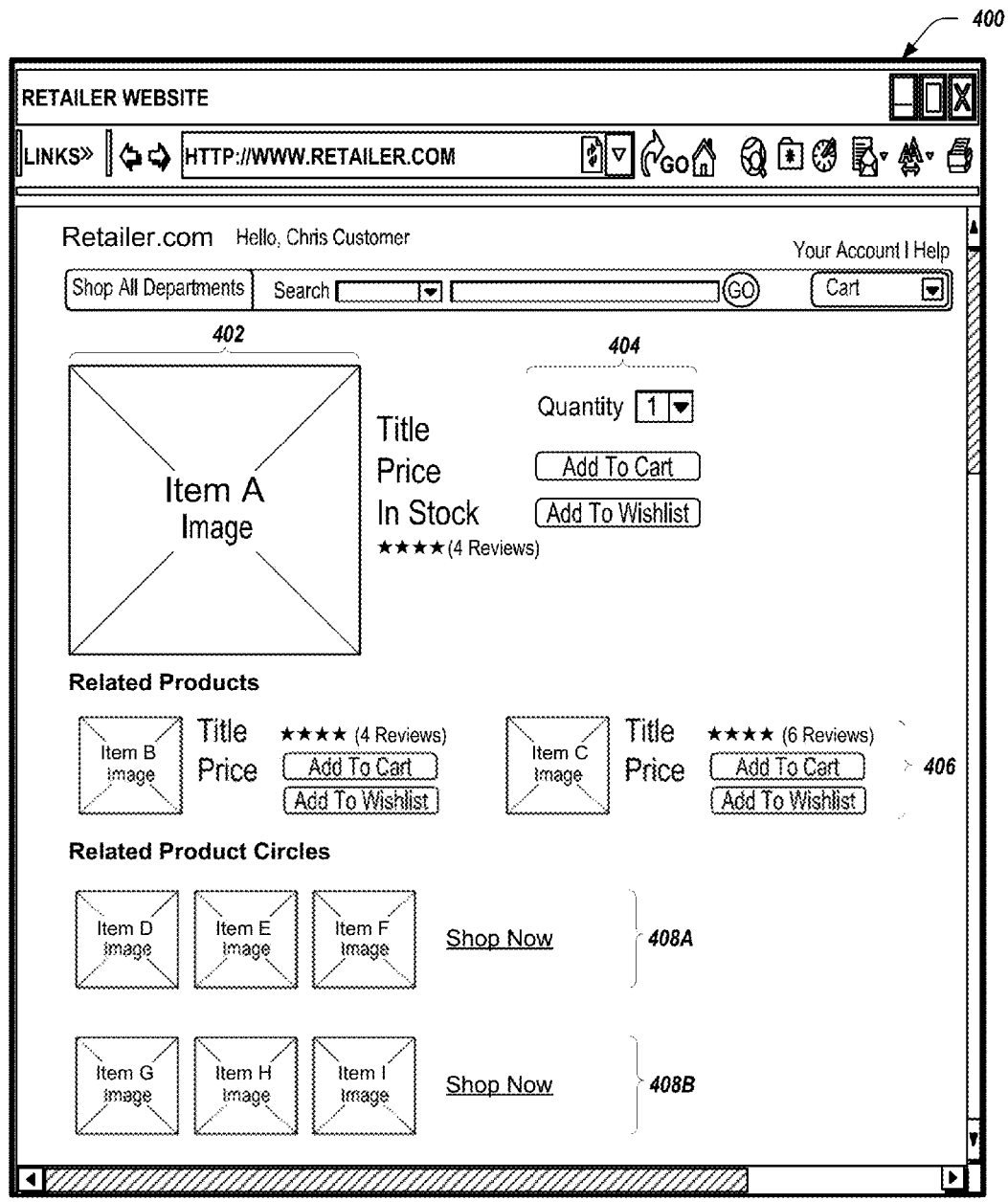
FIG. 4 is a pictorial diagram of an example user interface that illustrates an item detail page including various related item cluster recommendations, involving an electronic catalog system, such as the electronic catalog system of FIG. 2.

FIG. 4 illustrates an example user interface 400 that presents an item detail display page including details regarding "Item A" along with additional recommendations for items related to Item A, where Item A is available from an electronic catalog system, such as the electronic catalog system 100 of FIG. 2. "Item A" may, for example, be a book, an electronic book, a movie, music download, consumer product, or any other product or service available from the electronic catalog system 100. In other environments, the item represented on the item detail page may, for example, be a news story, news feed, network site, blog, author, musical artist, restaurant, or other type of item. A network page, such as an item detail display page, may include a number of distinct areas that can be used to display page features that contain various types of content. The example page features 402, 404, 406, 408A, and 408B shown in FIG. 4 are intended to schematically illustrate certain types of page features that can be used on a display page but are not intended to be limiting. For example, the content, appearance, positioning, sizes and so forth of the page features may be different than shown. The example page feature 402 includes an image of Item A and a brief description of Item A (for example, title, price, and whether the item is in stock).

Page feature 404 includes input controls selectable by Chris Customer to specify a number of items for purchase, and to add Item A to a shopping cart or to a wishlist.

Page feature 406 reflects recommendations of complementary items, which in one embodiment may correspond to items in the same item cluster as Item A. These recommendations may be generated by the electronic catalog system in accordance, for example, with the process 700 illustrated and described with reference to FIG. 7 herein.

Page features 408A and 408B present two example product circles including complementary items to Item A that may be displayed on the item detail display page for Item A. Similar to the product circles described with reference to FIG. 3, the product circles at page features 408A and 408B may represent two variations on an item cluster with which Item A is associated. For example, Item A may be a type of "earbud," which may be associated with an "Audio" item descriptor cluster (for example, as shown in FIG. 9). The electronic catalog system 100 may have generated two variant item clusters based on the Audio item descriptor cluster, one item cluster including items such as high-end audio equipment for audiophiles and musicians, and another item cluster including items such as mass-market value audio items for casual music listeners. One or both of these variant item clusters may be presented on the item detail display page for Item A to enable the user to quickly view other related items that may appeal to his or her interests. For example, Items D, E, and F may represent high-end audio equipment that may appeal to the user if he is an audiophile or musician, while Items G, H, and I may represent value audio items that may appeal to Chris Customer if he is a casual music listener. In some embodiments where Chris Customer is a returning or known customer, the electronic catalog system may be able to utilize account information associated with Chris to identify, for example, past behavior and activity (such as browsing behavior, purchase history, and the like) that may be useful to determine which particular product circle Chris may be more likely to find of interest. The electronic catalog system may then generate the item detail display page to include only the product circle (or circles) that are most relevant to Chris. In the embodiment shown in FIG. 4, each product circle is also presented with an optional link to "shop now" or view additional items similar to the items displayed, which may redirect the user to another user interface that presents additional items for the selected product circle.

Examples Cluster Generation Methods

Figure 5:
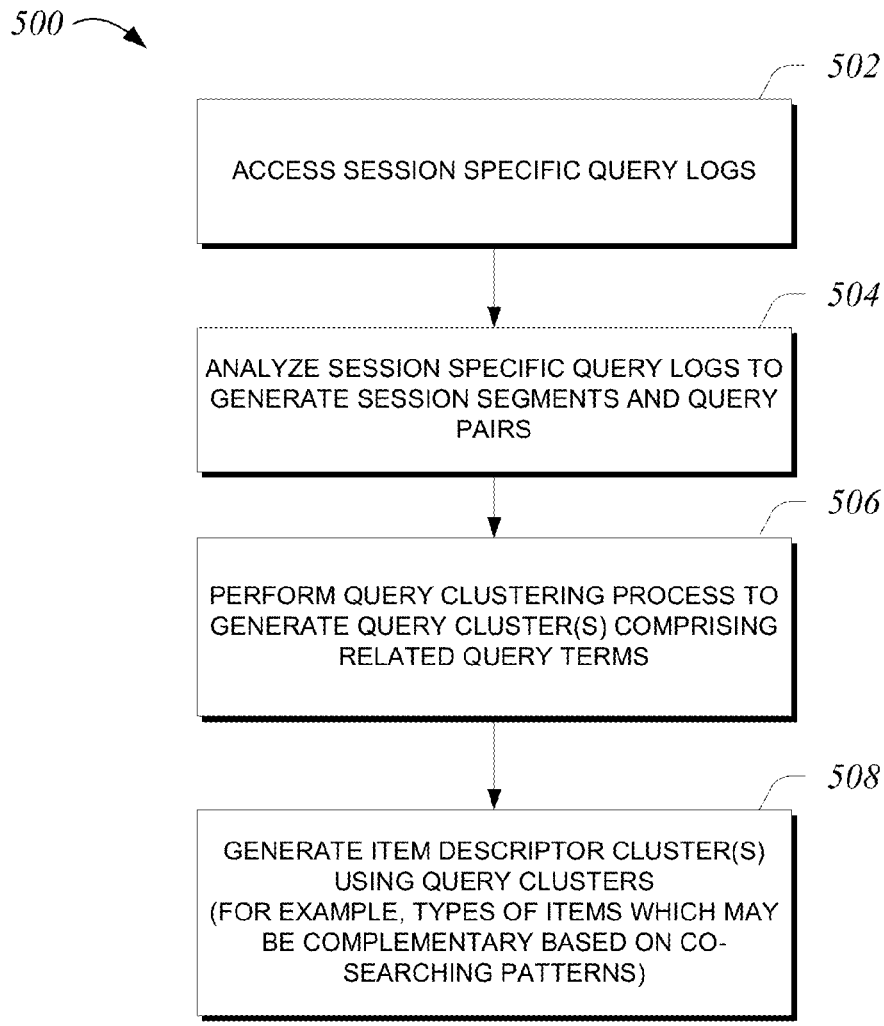
FIG. 5 is a flow diagram of an example method for analyzing search session queries and generating query cluster and item descriptor clusters, as implemented by an electronic catalog system, such as the electronic catalog system of FIG. 2.

FIG. 5 is a flow diagram of an example process 500, implemented at least in part by electronic catalog system 100 (as illustrated and described with reference to FIG. 2 herein) and/or its components such as the query cluster generator 120 and the item cluster generator 114. The process 500 may be performed to analyze search session data and generate query clusters and item descriptor clusters. The generated query clusters and/or item descriptor clusters may be used by a process that determines additional variations based on additional item descriptor cluster criteria, such as the sample process 600 described with respect to FIG. 6 herein. The generated query clusters and/or item descriptor clusters may be used by a process that determines or provides item recommendations to users, such as the sample process 700 described with respect to FIG. 7 herein.

At block 502, the process 500 accesses session specific query logs, (for example, from the specific session query logs data store 116 of FIG. 2). As described previously, the session specific query logs may include data describing search queries that users have submitted to the electronic catalog system 100 during one or more browsing sessions over a period of time. The volume of session specific query logs may grow to be very large as potentially millions of users access the electronic catalog system 100 daily, with each user potentially submitting several search queries to the electronic catalog system 100 during any given visit or session. These search queries may be stored and gathered by the electronic catalog system 100 over time. In one example embodiment, the number of search queries for a particular period of time spanning six days may total nearly 500 million records, with at least 33 million sessions including more than one search query.

At block 504, the electronic catalog system 100 (for example, via the query cluster generator 120) analyzes the session specific query logs to generate (or determine or identify) session segments. In general, a session segment may correspond to or include one or more search queries that are related to or associated with the same or similar items (or types of items) as indicated by the search criteria associated with each search query. In various embodiments, a search query may include at least one or more search terms, and optionally a search alias (for example, an item category or department for items available in the electronic catalog system 100).

The electronic catalog system may determine session segments using a number of heuristics, alone or in combination. One example heuristic involves analyzing the search terms to identify or detect changes that may signal a start of a new or different search session (or that may signal a continued search session). For example, a first search for "red shoes" and a second search for "black shoes" may logically correspond to or indicate a single search session based on the common search term "shoes." Or, as another example, a search for "black shoes" and "lcd television" may logically correspond to or indicate two different search sessions based on the lack of any shared search terms.

Another example heuristic involves analyzing the search alias to identify or detect changes that may signal a start of a new or different search session (or that may signal a continued search session). For example, a first search for "red shoes" under an "apparel" search alias and a second search for "red shoes" under a "shoes" search alias may logically correspond to or indicate a single search session based on the common search terms and an overlap (known or determined) in the associated search aliases (for example, "shoes" are generally a type of "apparel"). Or, as another example, a change in the associated search aliases may indicate two different item categories that may not be related (for example, "shoes" and "kitchenware" may not go together).

Once the session segments have been generated, the process 500 can further analyze the search query sessions to identify and extract query pairs. Query pairs may include pairings of search terms used within a given session segment. For example, suppose a session segment includes three searches: "red shoes," "strappy sandals," and "summer dress." The session segment may be identified or generated based on a common search alias such as "apparel" or based on other heuristic criteria that may correlate shoes, sandals, and dress to some degree. Then, query pairs may be generated to include for example: "shoes+sandals," "shoes+dress," and "sandals+dress." Once query pairs have been identified and extracted across all or a selected portion of session segments, they may be aggregated and analyzed as further described below during the query clustering process. For example, the electronic catalog system 100 may determine that the query pair "shoes+sandals" appears X-number of times across all session segments being analyzed.

The heuristics described above, and other heuristics and techniques used by the electronic catalog system 100, may be implemented using, for example, known machine learning techniques (such as nearest neighbor; factorization techniques such as Bayesian non-negative Matrix Factorization ("NMF"); K-means clustering; similarity measures including log likelihood similarity and cosine similarity; and latent semantic analysis) to analyze and find similarities in search queries. Additional application of normalization and filtering techniques may be applied to refine search query data as needed or desired (for example, identify singular items from plural search terms; remove or correct misspelled search terms; remove or exclude certain items, item categories, brands, and/or colors; and so on.). In one embodiment, query selection criteria (for example, stored in the query selection criteria data store 118), such as search term blacklists, may be accessed and used to normalize search query data. As mentioned previously the volume of session specific query logs to be analyzed may be quite large. In one example embodiment, analysis of nearly 500 million search queries over a six-day time period may result in 95 million search segments and 74 million query pairs.

At block 506, the process 500 performs a query clustering process to generate query clusters that include related query terms. The query clustering process may be based on the generated session segments and query pairs. For example, the identified query pairs may be used to generate and analyze a query network, such as the query network illustrated and described with reference to FIG. 8 herein. The query network may represent logical connections or relationships (edges) between the various query terms (nodes), wherein a frequency associated with each query pair may be represented by a relative weight of the connecting edge. The query network may be analyzed to discover and identify clusters of search terms (for example, items or item categories) that appear to be correlated with each other. The query clustering process may be implemented, for example, using any of the machine learning techniques described herein. In an embodiment, the query selection criteria may also be used at this stage to normalize search terms associated with each query pair being analyzed, such as to consolidate apparent duplicates that may appear due to pluralization, misspelling, and other criteria. Generated query clusters need not be mutually exclusive, and search terms may appear in more than one generated query cluster (for example, as may be the case when certain search terms in a first cluster have a high affinity with search terms appearing in another cluster). The generated query clusters and associated information may be stored by the electronic catalog system 100 (for example in query clusters data store 122 of FIG. 2).

At block 508, the process 500 generates item descriptor clusters using the generated query clusters. The item descriptor clusters may include, for example, item descriptors, item labels, and/or other item attributes that are generally descriptive of one or more items and/or types of items that may be related or complementary based on the co-searching patterns, session segments, and/or query term pairing discussed above. Item descriptor clusters may include specific types of items or item categories. The item descriptor clusters can represent groups, or bundles, of items and/or types of items that typically go well together. For example, an item descriptor cluster of "beach" may include items or item categories such as "swimsuit(s)," "swim trunks," "swim shorts," "tankini," "board shorts," "bikini," "swimwear," "rash guard," and "bathing suits." Additional examples of item descriptor clusters that may be generated from the process 500 are illustrated and described with reference to FIG. 9 herein. The item descriptor clusters and associated information may be stored by the electronic catalog system 100 (for example in item clusters data store 108 of FIG. 2). The item descriptor clusters may then be used to generate additional variant item descriptor clusters, to generate associated item clusters, and/or to provide item recommendations, for example as described with reference to FIG. 7 herein.

Figure 6:
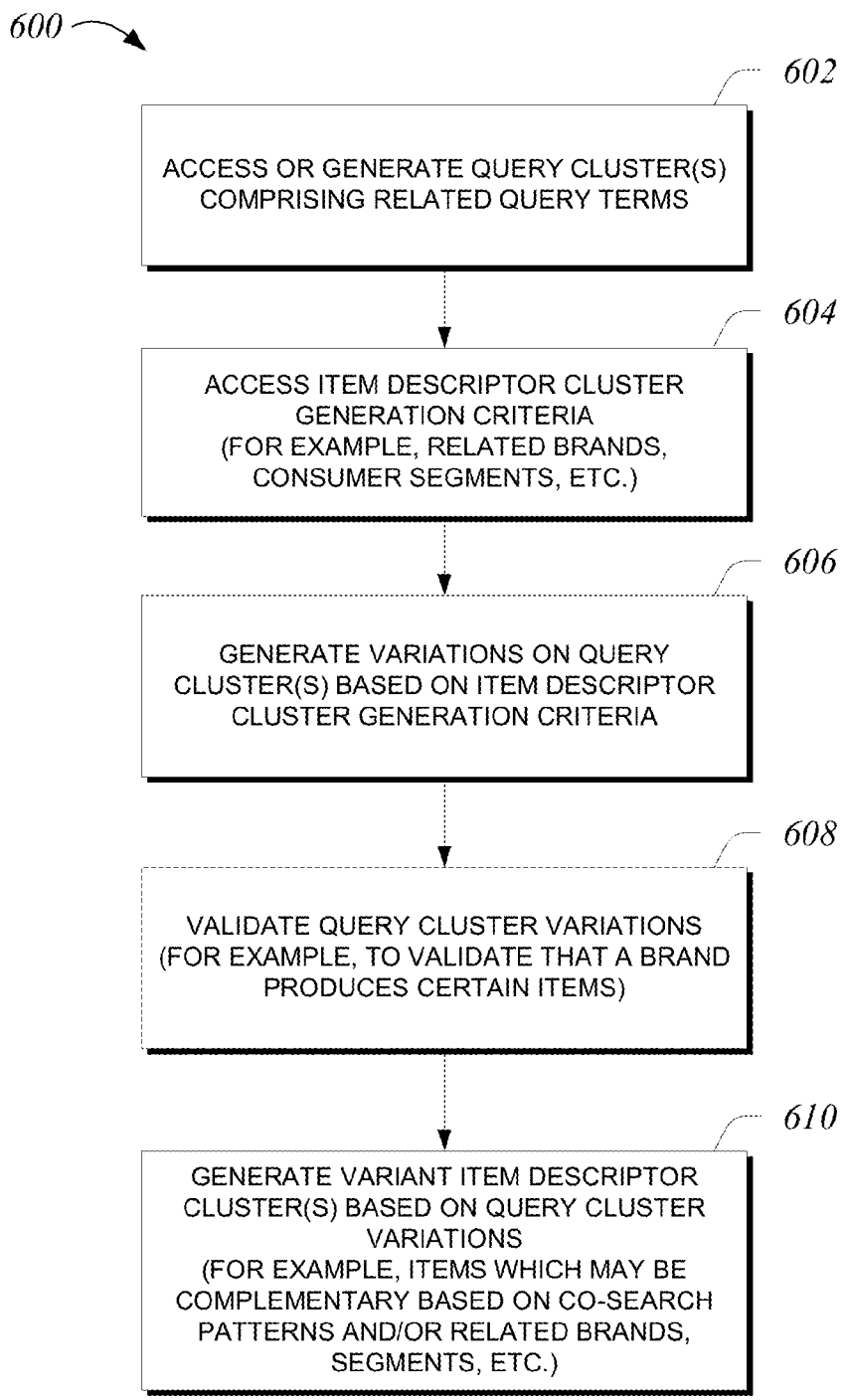
FIG. 6 is a flow diagram of an example method for generating variations on query clusters and item descriptor clusters, as implemented by an electronic catalog system, such as the electronic catalog system of FIG. 2.

FIG. 6 is a flow diagram of an example process 600, implemented at least in part by electronic catalog system 100 (as illustrated and described with reference to FIG. 2 herein) and/or its components such as the query cluster generator 120 and the item cluster generator 114. The process 600 may be performed to generate variations on query clusters and/or item descriptor clusters generated by the process 500 described above. The variations may be used by a process that determines or provides item recommendations to users, such as the sample process 700 described with respect to FIG. 7 herein.

At block 602, the process 600 accesses or generates query clusters that include related query terms. In one embodiment, the query clusters may be accessed from a data store, such as the query clusters data store 122. In another embodiment, the query clusters may be generated according to the query clustering process described in more detail with reference to block 506 of FIG. 5.

At block 604, the process 600 accesses item descriptor cluster generation criteria (for example, from the item cluster generation criteria data store 118 of FIG. 2). The item descriptor cluster generation criteria may include, for example, data or information describing one or more related brands, consumer segments or lifestyles, or other data that may be used to identify or determine consumer segments or lifestyles (for example, prices or price ranges for certain items or item categories that may correlate to different buyer segments).

At block 606, the process 600 uses the item descriptor cluster generation criteria to generate variations on the query clusters. For example, the item descriptor cluster generation criteria may include additional search terms that may potentially be coupled to queries or query clusters to generate new queries or query clusters. The results obtained from executing the new queries or query clusters may for example represent a subset of the results obtained from executing the original queries or query clusters. Thus, the item descriptor cluster generation criteria may represent one way to filter the results obtained from executing the original queries or query clusters, such that the filtered results include items that satisfy the particular item descriptor cluster generation criteria. Thus, an X-number of sets of item descriptor cluster generation criteria corresponding to different segments may be applied to a Y-number of query clusters to potentially generate an X times Y-number of variant query clusters.

For example, a first set of item descriptor cluster generation criteria may correspond to "premium" brands, and a second set of item descriptor cluster generation criteria may correspond to "everyday" brands. Each of these two sets may be applied to the "beach" query cluster including one or more query terms for items related to the beach to generate a "premium brands beach" query cluster and an "everyday brands beach" query cluster. Each of these resulting query clusters may be executed to obtain more tailored or customized results.

At block 608, the process 600 may perform an optional validation process to validate the query cluster variations.

For example, some combinations of item descriptor cluster generation criteria with a query cluster may lead to generation of a valid query result (or no query results may be obtained). To improve efficiency and efficacy of the search results obtained from execution of the query cluster variations, queries that are determined to be invalid or to yield no matches may be removed from the query cluster variation. For example, one validation check that may be performed, with reference to item descriptor cluster generation criteria that specifies related brand(s), may be to check whether the related brand(s) produces items in the item cluster generated in association with the item descriptor cluster. Thus, if a query cluster includes the search term "shoes," but one of the related brands does not produce shoes, then the variant search query including that brand and "shoes" may be removed. In another example, if one item selection criteria specifies a certain price range, but no shoes are offered in that price range, then the variant search query including that price range and "shoes" may be removed.

At block 610, the process 600 generates variant item descriptor clusters using the query clusters variations. The resulting variant item descriptor clusters may include, for example, item descriptors, item labels, and/or other item attributes that are generally descriptive of one or more items that may be related or complementary based on the co-searching patterns, session segments, and/or query term pairing discussed above, as well as based on the additional item descriptor cluster generation criteria as described above. Thus, one variant item descriptor cluster for "premium brands beach" may include items such as: designer sunglasses; designer swimwear; specially formulated lotions and/or sunscreens; beach items more typically identified as luxury or upscale products; and/or other beach-related items that may be above a certain price point. Another variant item descriptor cluster for "everyday brands beach" may include items such as: commodity beach towels; mass market sunscreens; beach toys (for example, balls, sandcastle gear, and the like); beach bags; and/or other beach-related items that may be within a certain price range less than the premium brands price point.

The variant item descriptor clusters and associated information may be stored by the electronic catalog system 100 (for example in item clusters data store 108 of FIG. 2). The item descriptor clusters, including any variant item descriptor clusters, may then be used to generate associated item clusters or to provide item recommendations, for example as described with reference to FIG. 7 herein.

Figure 7:
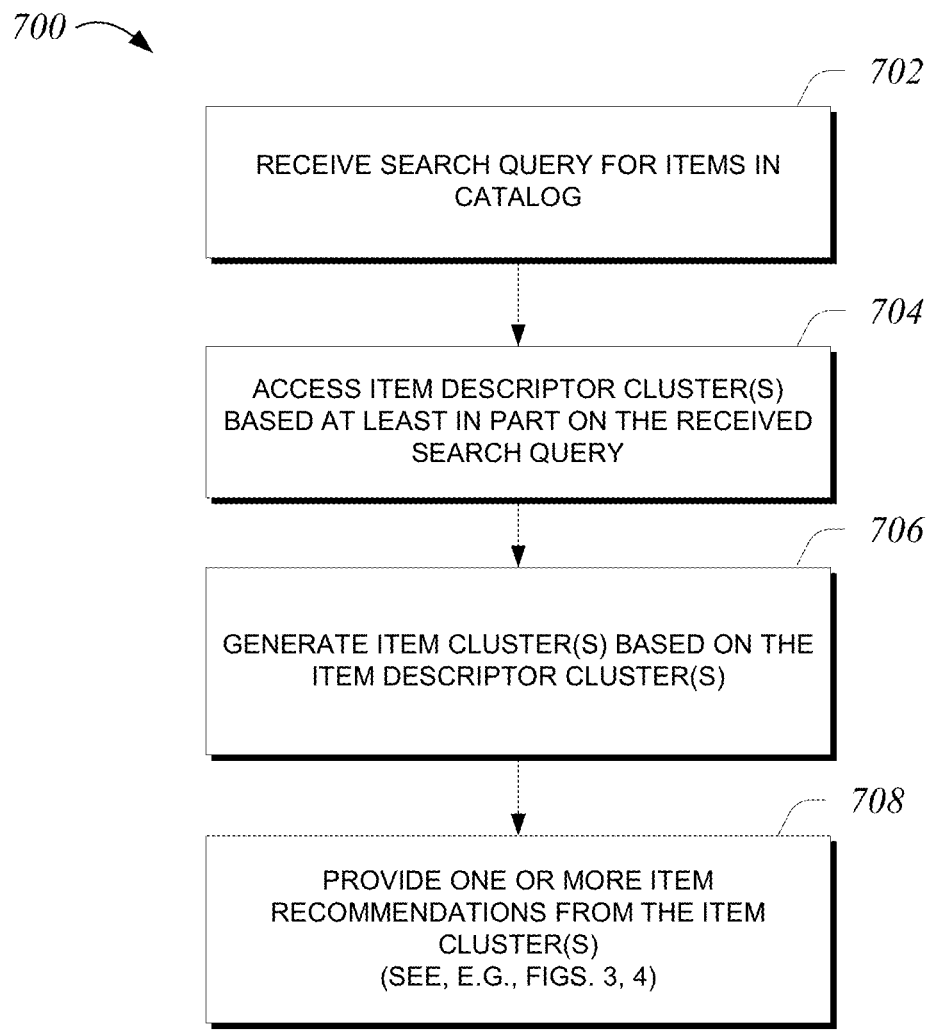
FIG. 7 is a flow diagram of an example method for generating item recommendations based at least in part on a search query and item descriptor clusters, as implemented by an electronic catalog system, such as the electronic catalog system of FIG. 2.

FIG. 7 is a flow diagram of an example process 700 for generating item recommendations based at least in part on a search query and item clusters, as implemented by an electronic catalog system, such as the electronic catalog system of FIG. 2.

At block 702, the process 700 receives a search query for items in the catalog. The search query may include one or more search terms that the electronic catalog system (for example, the catalog search engine 112) may parse and analyze in order to find matching items in the catalog content data store 106. The search terms may also be used to identify one or more item descriptor clusters that may be related to the item or items being searched for.

At block 704, the process 700 accesses item descriptor clusters (for example, from the item clusters data store 108) based at least in part on the received search query. The search query may include search terms that appear in one or more item descriptor clusters. For example, a search query including the search term "tv stand" may be used to access one item descriptor cluster for "home entertainment" items and another item descriptor cluster for "furniture" (for example, as illustrated in the example item descriptor clusters depicted in FIG. 9). Or, a search query for the search term "swimsuit" may be used to access only one item descriptor cluster for "beach" items. In one embodiment, the item descriptor clusters may be generated dynamically in response to the search query request, for example using the processes 500 or 600 described with reference to FIGS. 5 and 6 herein.

At block 706, the process 700 generates one or more item clusters based on the item descriptor cluster(s). Each item cluster may include one or more specific items (e.g., items available in the electronic catalog) that match criteria associated with an associated item descriptor cluster. In one embodiment, the item clusters may be generated dynamically in response to on-demand requests, for example, in order to provide item suggestions. In another embodiment, the item clusters may be generated in advance and stored for later access. Item clusters may be used to generate and provide item recommendations or suggestions, for example in response to user search requests or item viewing events, as further described below.

At block 708, the process 700 can use the accessed or generated item clusters to provide one or more item recommendations. For example, as described and illustrated with reference to FIG. 3, the item recommendations may be included or presented for display along with the search query results. In another embodiment, the item recommendations may be provided in another way. For example, item recommendations based on the search query may be generated and provided later via an email or other communication means.

In one embodiment, the item recommendations may include individual items selected or identified from one or more item clusters. In another embodiment, the item recommendations may include one or more item clusters or bundles, optionally with an option for the user to self-select into one of the item clusters for further item browsing. In another embodiment, the item recommendations may be selected and provided based on a relative frequency of the search query criteria being associated with various query terms in a query cluster. For example, if "shoes" and "watches" appear highly correlated based on the query pair analysis described above, then a subsequent user search for "shoes" may cause the electronic catalog system to generate an item recommendation for a watch, or to generate multiple item recommendations for items in the "casual" item descriptor cluster (for example, as depicted in FIG. 9) with a watch item displayed first or otherwise prominently in a corresponding user interface page. In one embodiment, selection of particular item recommendations or item clusters to provide to users may take into account other factors including data associated with those items, such as user clicks or views, average OPS, average number of purchases, user reviews or ratings, sales trends, and so on.

Other variations on the recommendation process described with reference to FIG. 7 may also be possible. For example, as described and illustrated with reference to FIG. 4, the electronic catalog system may receive a request for an item detail page, and use item attribute information associated with the requested item to access or generate related item clusters and provide item recommendations on the item detail page based on the related item clusters.

Examples of Query and Item Descriptor Cluster Outputs

Figure 8:
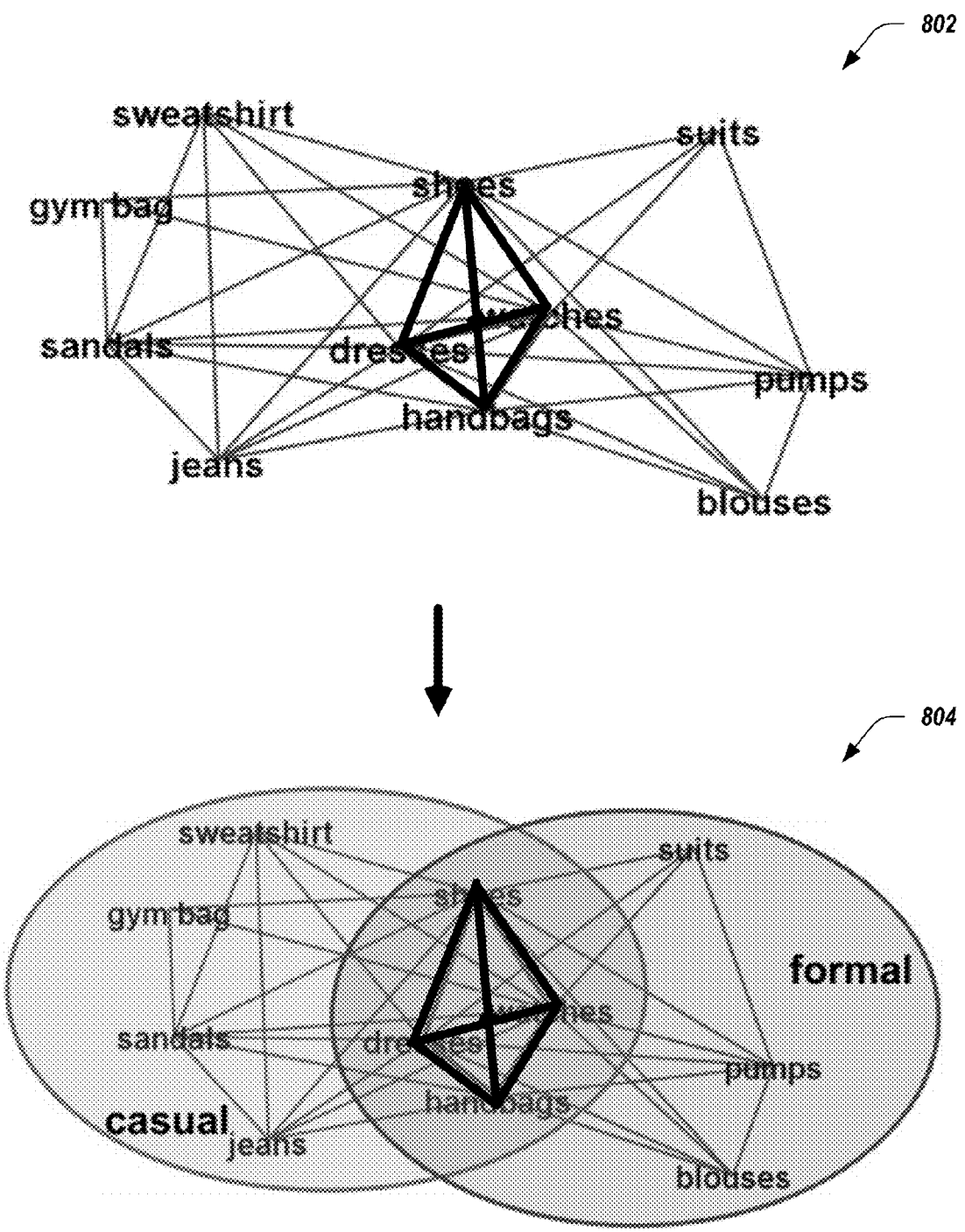
FIG. 8 is a pictorial diagram depicting correlations among multiple query search terms and one example of associated item clusters, as generated according to one embodiment of an electronic catalog system, such as the electronic catalog system of FIG. 2.

FIG. 8 is a pictorial diagram depicting a query network and one example of associated item descriptor clusters, as generated according to one embodiment of an electronic catalog system, such as the electronic catalog system 100 of FIG. 2. The query network 802 illustrates correlations among multiple query search terms. The query network may represent logical connections or relationships (edges) between the various query terms (nodes), wherein a frequency associated with each query pair may be represented by a relative weight of the connecting edge. As illustrated in FIG. 8, darker or bolded edges in the query network represent stronger correlations and/or frequencies of the connected search terms appearing together in any given search session segment.

The query network may be analyzed to discover and identify clusters of search terms (for example, items or item categories) that appear to be correlated with each other. Two illustrative clusters—"casual" and "formal" are shown in the clustered query network 804. As the clustered query network shows, query terms (nodes) may belong to or be associated with more than one cluster (sometimes referred to as soft assignment). For example, "shoes," "dresses," "watches," and "handbags" may be correlated with both "casual" and "formal." At the same time, "shoes" may be correlated with both "suits" and "sweatshirts," although "suits" and "sweatshirts" may not be correlated with each other. Query clustering using this type of soft assignment can enable generation of overlapping clusters that may be formed naturally based on the particular search contexts and scenarios.

The query clustering process may be implemented, for example, using any of the machine learning techniques described herein. For example, network modeling techniques such as Bayesian non-negative Matrix Factorization ("NMF") may be used to identify potential query clusters based on the relationships between various edges and nodes in the network. One goal of these clustering processes is to identify an affinity between a particular node (search term) with the cluster. Examples of item descriptor clusters that may be generated from the query clustering and query network analysis described here are illustrated and described with reference to FIG. 9 herein.

FIG. 9 is a pictorial diagram depicting several example item descriptor clusters, as generated according to one embodiment of an electronic catalog system, such as the electronic catalog system 100 of FIG. 2. The example item descriptor clusters represent one actual output generated as result of applying the process 500 of FIG. 5. The item descriptor clusters shown include, for example, "home entertainment," "casual," "audio," "bedding," "home theater," "beach," and "furniture." Of course, many other item descriptor clusters may be possible including "toddler toys," "kid playtime," "music," "books," and so on. In some embodiments, item descriptor clusters may be combined or further broken down to generate item descriptor clusters with any level of granularity as may be desired. The item descriptor clusters may be used to, for example, generate item recommendations for users of the electronic catalog system, tailored to the users' searching or browsing activity in real-time to provide a highly customized user shopping experience. The item descriptor clusters may also be used by the electronic catalog system to further generate variant item descriptor clusters that may be even more tailored to a particular search session or user.

Other

In some embodiments, the electronic catalog system 100 can be configured differently than shown in FIG. 2. Many variations and alternatives are possible, and no single component or group of components is essential or required to be present in every embodiment of the electronic catalog system 100.

The electronic catalog system 100 may also include functionality and components (not shown) for enabling users to perform various other types of functions, including but not limited to the following: (1) purchasing items selected from the electronic catalog, (2) creating wish lists of items selected from the catalog, and searching for and viewing the wish lists of other users, (3) conducting keyword searches for specific catalog items, (4) browsing the catalog using a browse category-based item browse tree, (5) creating personal profiles that are viewable by other users, (6) posting items for sale in the electronic catalog, (7) tagging specific catalog items, and (8) posting customer reviews, recommendations and ratings of particular catalog items.

The various components shown in FIG. 2 may be implemented in an appropriate combination of hardware and software. For example, the network server 102 may be implemented using physical servers (with processors, memory, etc.) that are programmed with executable program code to respond to display page requests by generating and returning network pages. As a further example, the network server 102 could be implemented by virtual machines instances existing on one or more physical computing devices. The query cluster generator 120 and item cluster generator 114 may similarly be implemented using programmed physical servers, virtual machine instances, or general purpose computers.

In the environment shown in FIG. 2, a user of the electronic catalog system 100 may utilize a user computing device 130 to communicate with the electronic catalog system 100. The communication may occur via a communication network, such as the Internet or other communications link. Those skilled in the art will recognize that the user computing device 130 may be any of a number of computing devices that are capable of communicating over a network. For example, the user computing devices can include, but are not limited to, a laptop, personal computer, personal digital assistant (PDA), hybrid PDA/mobile phone, mobile phone, electronic book reader, digital media player, tablet computer, gaming console or controller, kiosk, augmented reality device, other wireless device, set-top or other television box, and the like.

The network may be any wired network, wireless network or combination thereof. In addition, the network may be a personal area network, local area network, wide area network, cable network, satellite network, cellular telephone network, etc. or combination thereof. In addition, the network may be a personal area network, local area network, wide area network, cable network, satellite network, cellular telephone network, etc. or combination thereof. In addition, the network may be a personal area network, local area network, wide area network, over-the-air broadcast network (e.g., for radio or television), cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or some other type of wireless network. The network can use protocols and components for communicating via the Internet or any of the other aforementioned types of networks. Protocols and components for communicating via the Internet or any of the other aforementioned types of communication networks are well known to those skilled in the art and are not described in more detail herein.

The electronic catalog system 100 is depicted in FIG. 2 as operating in a distributed computing environment including several computer systems that are interconnected using one or more computer networks. The electronic catalog system 100 may have a fewer or greater number of components than are illustrated in FIG. 2. Thus, the depiction of the electronic catalog system 100 in FIG. 2 should be taken as example and not limiting to the present disclosure. For example, the electronic catalog system 100 could implement various Web services components and/or peer-to-peer network configurations to implement at least a portion of the processes described herein.

The electronic catalog system 100 is also responsible for providing communication with various user devices, such as user computing device 102. The communication provided by the electronic catalog system 100 may include generating text and/or graphics, possibly organized as a user interface using hypertext transfer or other protocols in response to information inquiries received from the various user devices. The electronic catalog system 100 may obtain information on available goods and services from one or more data stores, such as catalog content repository 106, as is done in conventional electronic commerce systems. In certain embodiments, the electronic catalog system 100 may also access item data from other data sources, either internal or external to electronic catalog system 100.

CONCLUSION

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various example logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    under control of a computing device configured with specific computer-executable instructions:
        accessing, from an electronic data store, search history data for a plurality of users of an electronic catalog, said search history data comprising session query logs, each session query log including one or more query terms associated with a search request submitted by a respective user;
        analyzing the session query logs to generate one or more search session segments, each search session segment corresponding to a distinct search session and comprising one or more search requests;
        for each respective search session segment, generating one or more query pairs, each query pair comprising at least two query terms that are associated with the one or more search requests comprised in the respective search session segment;
        determining, for each respective query pair across all of the one or more search session segments, a query pair frequency indicative of how many times the respective query pair appears across all of the one or more search session segments;
        clustering the query pairs, based at least in part on the determined query pair frequencies, into a query cluster, said query cluster comprising two or more query terms determined to be highly correlated based at least in part on the clustering;
        accessing correlated attribute data, said correlated attribute data including two or more correlated attributes that tend to be correlated to each other;
        generating an item descriptor cluster comprising combinations of the two or more query terms and the two or more correlated attributes;
        generating, by executing a search request on the electronic catalog using the item descriptor cluster, an item cluster comprising items having at least one of the two or more correlated attributes; and
        providing an item recommendation for at least one item contained in the item cluster.

2. The computer-implemented method of claim 1, wherein the item recommendation is provided in a search results page that is generated in response to receiving a current search request.

3. The computer-implemented method of claim 1, wherein the search history data comprises search history data gathered over a period of years.

4. The computer-implemented method of claim 1, wherein the session query logs collectively comprise at least millions of search requests received from at least millions of users.

5. The computer-implemented method of claim 1, wherein the clustering is based at least in part on at least one of Bayesian NMF clustering, K-means clustering, latent semantic analysis, or a cosine similarity technique.

6. A system comprising:
    an electronic data store configured to at least store search history data associated with search requests submitted to an electronic catalog; and
    a computing system comprising one or more hardware computing devices, said computing system in communication with the electronic data store and configured to at least:
        analyze a plurality of submitted query terms associated with search session query logs to generate a plurality of query term pairs, each query term pair comprising at least two query terms that are associated with respective search requests associated with a single search session;
        determine, for each respective query pair, a query pair frequency indicative of how often the query pair appears in the search session query logs;
        cluster, based at least in part on the determined query pair frequencies, the query pairs into a query cluster, said query cluster comprising two or more query terms determined to be highly correlated based at least in part on said clustering;
        access related item attribute data, said related item attribute data including two or more correlated item descriptors for related items, wherein the two or more correlated item descriptors tend to be correlated to each other;
        generate an item descriptor cluster comprising combinations of the two or more query terms comprised in the query cluster and the two or more correlated item descriptors;
        generate, by executing a search request on the electronic catalog using the item descriptor cluster, an item cluster comprising two or more items, each item of the two or more items having an attribute corresponding to at least one of the correlated item descriptors; and
        providing an item recommendation comprising at least one of the two or more items.

7. The system of claim 6, wherein the item recommendation is provided in a catalog page that is generated by the electronic catalog.

8. The system of claim 6, wherein the session query logs collectively comprise at least millions of search requests.

9. The system of claim 6, wherein the clustering is based at least in part on at least one of Bayesian NMF clustering, K-means clustering, latent semantic analysis, or a cosine similarity technique.

10. The system of claim 6, wherein the related item attribute data includes at least one of: related brands, prices, or target market segments.

11. A computer-implemented method comprising:
generating, based at least in part on a co-occurrence analysis of search histories associated with an electronic catalog, a cluster of item descriptors describing types of items in the electronic catalog that tend to be searched for in the electronic catalog in combination, the cluster of item descriptors including at least a first item descriptor representing a first item type and a second item descriptor representing a second item type;
generating, based at least in part on the cluster of item descriptors, a plurality of item clusters, each item cluster including a plurality of items in the electronic catalog and including at least a first item of the first item type and a second item of the second item type; and
providing a catalog item recommendation based at least in part on the plurality of item clusters,
said method performed by an electronic catalog system comprising one or more computing devices.

12. The computer-implemented method of claim 11, wherein the catalog item recommendation is provided in a search results page that is generated in response to receiving a current search request.

13. The computer-implemented method of claim 11, wherein generating the cluster of item descriptors further comprises:
generating a query cluster based at least in part on the co-occurrence analysis; and
generating the cluster of item descriptors based at least in part on the query cluster.

14. The computer-implemented method of claim 11, wherein the search histories collectively comprise at least millions of search requests.

15. The computer-implemented method of claim 11, wherein the co-occurrence analysis is performed using at least one of Bayesian NMF clustering, K-means clustering, latent semantic analysis, or a cosine similarity technique.

16. Non-transitory physical computer storage comprising computer-executable instructions stored thereon that, when executed by a hardware processor, are configured to perform operations comprising:

accessing, from an electronic data store that stores search session query log data, query pair frequency data indicative of how often a plurality of query pairs appear in search session logs associated with an electronic catalog;
generating a query cluster based at least in part on the accessed query pair frequency data by clustering the query pairs, said query cluster comprising at least two query terms determined to be highly correlated based at least in part on said clustering;
generating an item descriptor cluster comprising two or more query terms associated with the query cluster;
executing a search request on the electronic catalog using the item descriptor cluster to generate an item cluster comprising at least one item having an attribute corresponding to at least one of the two or more query terms; and
providing an item recommendation comprising the at least one item.

17. The non-transitory physical computer storage of claim 16, wherein the operations further comprise:
two or more correlated item attribute terms for related item attributes, wherein the two or more correlated item attributed terms tend to be correlated to each other; and
updating the item descriptor cluster to comprise combinations of the two or more query terms and the two or more correlated item attribute terms,
wherein the item cluster that is updated comprises at least one item having an attribute corresponding to at least one of the related item attributes.

18. The non-transitory physical computer storage of claim 16, wherein the item recommendation is provided in a search results page that is generated in response to receiving a current search request.

19. The non-transitory physical computer storage of claim 16, wherein the session query logs are gathered over a period of years.

20. The non-transitory physical computer storage of claim 16, wherein the session query logs collectively comprise at least millions of search requests received.

21. The non-transitory physical computer storage of claim 16, wherein the clustering is based at least in part on at least one of Bayesian NMF clustering, K-means clustering, latent semantic analysis, or a cosine similarity technique.

* * * * *